United States Patent Office 3,407,225
Patented Oct. 22, 1968

3,407,225
4,7-METHANOINDENE DERIVATIVES
Morris Dunkel, Paramus, N.J., assignor to Universal Oil Products Company, Des Plaines, Ill., a corporation of Delaware
No Drawing. Filed Apr. 15, 1965, Ser. No. 448,285
7 Claims. (Cl. 260—488)

ABSTRACT OF THE DISCLOSURE

Polyhydro-4,7-methanoindenes substituted in the 5 or 6 position both with (a) vinyl or ethynyl and (b) a radical of the formula X—O— where X is hydrogen or acyl. The compounds are useful as olfactory ingredients for perfumes, soaps and other toilet goods.

This invention relates to new compositions of matter, to the preparational processes therefor and to perfumes containing the compositions as olfactory ingredients. More particularly, this invention relates to novel 4,7-methanoindene derivatives.

The novel 4,7-methanoindene compositions of this invention have the following structural formulae:

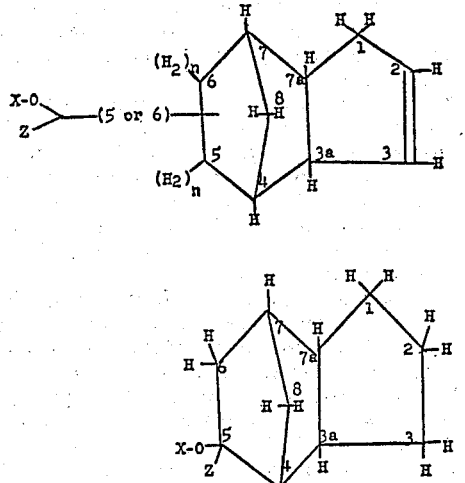

wherein X is a member selected from the group consisting of hydrogen and an acyl group containing 1 to 7 carbon atoms, O is oxygen, Z is a member selected from the group consisting of vinyl and ethynyl, H is hydrogen and $n$ is an integer of 0 and 1; provided that for the carbon atom substituted with the X—O and Z substituents, the integer associated therewith is O and the other integer is 1. Because of the existence of the double bond in the hexahydromethanoindenes, illustrated as Figure I above, the positions 5 and 6 are not chemically equivalent, and accordingly, when the hexahydromethanoindene are substituted with the X—O and Z substituents according to this invention, different isomeric compositions result depending upon whether the substituents are on the 5 or the 6 positioned carbon atom. Moreover, the extremely close physical similarity of such isomers prevents ready identification and separation of the different isomers from each other. For these reasons, it is intended that both compositions as well as mixtures thereof be encompassed within this invention by describing the hexahydromethanoindenes in this specification and appended claims as hexahydromethanoindenes substituted in one of the 5 and 6 positions with the X—O and Z radicals. No comparable problem exists for the octahydromethanoindenes of this invention, illustrated as Figure II above, inasmuch as there is no double bond in the cyclopentane portion of the molecule and the positions 5 and 6 are accordingly chemically equivalent. For this reason, the octahydromethanoindenes are described in this specification and appended claims as being substituted with the X—O and Z radicals in the 5 position. It should be understood, however, that this nomenclature is for convenience only inasmuch as for these methanoindenes the positions 5 and 6 are identical. Both the octahydro- and hexahydromethanoindenes of this invention also exist in the exo and endo forms and the substituents X—O and Z also exist in the exo and endo forms. It is intended that all of these isomeric compositions be encompassed within this invention.

The novel 4,7-methanoindenes disubstituted in one of the 5 or 6 positions with the aforementioned substituents X—O and Z find wide utility in the chemical field and are especially useful as plasticizers, ingredients of synthetic waxes and resins, or as intermediates for drugs or insecticides. Of these many uses, however, the most valuable use for these compounds is in perfumery due to their highly pleasant odoriferous nature. Of considerable significance in this respect is that certain of these compounds have odors which are markedly similar to that of the highly valuable, naturally occurring lavender oil.

Accordingly, it is an object of this invention to provide a new class of compounds consisting of 4,7-methanoindenes having two specific substituents at one of the 5 and 6 positions. Another object is to provide a preparational process for these 4,7-methanoindenes. Still another object of this invention is to provide perfume compositions which contain as olfactory ingredients thereof these novel 4,7-methanoindenes. Other objects of this invention will become apparent from the following further detailed description thereof.

The 4,7-methanoindene derivatives of this invention in general are prepared from corresponding ketones by reaction with a vinyl magnesium halide to obtain the vinyl substituted compounds and by reaction with a metal acetylide to obtain the ethynyl substituted compounds. The vinyl or ethynyl substituted products of these reactions are then in general reacted with acyl halides or acid anhydrides to obtain the desired acyloxy substituted compounds or with water to obtain the hydroxy substituted compounds.

The ketone starting material may be readily obtained from 3a,4,7,7a-tetrahydro-4,7-methanoindene, through a hydroxy intermediate, by reacting the tetrahydromethanoindene with aqueous sulfuric acid to obtain 3a,4,5, 6,7,7a-hexahydro-4,7-methanoindenols substituted in one of the 5 and 6 positions with hydroxy. For purposes of convenience, the precursor of the octahydromethanoindenes of this invention is prepared at this point by mildly hydrogenating the hydroxy substituted hexahydromethanoindene prepared as above to obtain 2,3,3a,4,5,6,7,7a-octahydro-4,7-methanoindene having the hydroxy substitutent in the 5 position. The ketone of the octahydro or hexahydromethanoindene is then prepared from the corresponding hydroxy substituted methanoindene either by oxidation such as with potassium dichromate in the presence of sulfuric acid or by dehydrogenation with a suitable catalyst such as copper chromite to obtain 5-oxo-2,3,3a,4,5,6,7-7a-octahydro-4,7-methanoindene or 3a,4,5,6,7,7a-hexahydro-4,7-methanoindene having the oxo substitutent in one of the 5 and 6 positions.

The vinyl substituted hexahydro or octahydro 4,7-methanoindenes represented by Figures I or II above where Z is vinyl are prepared specifically by first reacting the corresponding ketone with a vinyl Grignard comprising a vinyl magnesium halide wherein the halide may be chloride, bromide or iodide. The vinyl Grignard may be prepared according to conventional methods and an acceptable practice for the preparation of the compounds of this invention is to prepare the vinyl magnesium halide in situ just prior to the reaction thereof with the desired methanoindenyl ketone. This may be effected by charging a vinyl halide, such as vinyl chloride, in gaseous state to a reaction vessel containing a suitable solvent such as tetrahydrofuran and a measured quantity of magnesium metal turnings, preferably a 10 percent stoichiometric excess based upon the quantity of the ketone to be reacted therewith. The reaction is conducted at a temperature of about 30° to 70° C. and is continued until there is a visual disappearance of the magnesium turnings which evidences complete reaction of the magnesium with the vinyl halide.

The desired methanoindenyl ketone, preferably dissolved in a suitable solvent such as tetrahydrofuran, is then slowly added with stirring to the vinyl magnesium halide at a rate regulated to keep the reaction under control and to maintain the temperature of the exothermic reaction within the range of from about 25° to 60° C. To obtain desirable yields and to insure complete reaction of the ketone and vinyl Grignard, which react on an equimolar basis, it is preferable to use an excess of the vinyl Grignard of up to 20 percent or more. This excess may be controlled as indicated above by regulating the quantity of magnesium used initially to prepare the vinyl Grignard and by then completely reacting the magnesium with the vinyl halide. The reaction of the vinyl Grignard and the methanoindenyl ketone proceeds rapidly and is generally completed shortly after all of the ketone has been added. However, to insure completion the reaction mixture is usually stirred for about one half hour more. The resulting vinyl substituted reaction product is then further reacted in several alternate ways to obtain the different vinyl substituted methanoindenes of this invention.

When it is desired to obtain vinyl substituted methanoindenes which are also substituted with hydroxy, that is where in Figures I or II above X of the X—O radical is hydrogen and the Z radical is vinyl, the vinyl substituted reaction product prepared according to the above procedure is decomposed with water. Preferably the water contains sufficient acidity to provide a clear aqueous phase in the reaction mixture after decomposition of the reaction product. To this end and to facilitate the decomposition, an acid or an acid-acting salt such as hydrochloric acid or ammonium chloride may be added to the water.

The decomposition reaction with water may be effected by simply adding the water or preferably an aqueous solution containing the aforementioned acidic materials to the reaction product in a quantity sufficient to form an aqueous layer at a temperature of about 25° C. The desired hydroxy and vinyl substituted methanoindene is then recovered from the reaction mixture by conventional methods such as extraction and distillation. The vinyl and hydroxy substituted methanoindenes prepared in this fashion are 3a,4,5,6,7,7a-hexahydro-4,7-methanoindene substituted in one of the 5 and 6 positions with hydroxy and vinyl and 5-hydroxy-5-vinyl-2,3,3a,4,5,6,7,7a-octahydro - 4,7-methanoindene.

When it is desired to obtain vinyl substituted methanoindenes which are also substituted with an acyloxy substitutent, that is where in Figures I or II above the X of the X—O radical is an acyl group and the Z radical is vinyl, the vinyl substituted reaction product prepared accordingly to the above procedure is reacted with either an acyl halide or an acid anhydride. The acyl halides or acid anhydrides which are used for this purpose have from 1 to 7 carbon atoms in the acyl portion or portions of their molecules and include acetyl, propionyl, butryl or isohexyl halides or the corresponding acid anhydrides as well as any isomeric forms or lower alkyl substituted forms thereof such as alpha- or beta-methyl crotonyl or isobutyryl halides or the corresponding acid anhydrides thereof. The halide portion of the acyl halides may be chloride or bromide with the chlorides being the preferred reactants.

The reaction of the vinyl substituted reaction product and the acyl halide or acid anhydride may be effected by slowly adding the desired acyl halide or acid anhydride, preferably dissolved in a solvent, to the vinyl substituted reaction product with the temperature of the exothermic reaction being maintained at about 20° to 50° C. The resulting mixture is then stirred or allowed to stand for from about 1 to 50 hours or more to insure complete reaction. A stoichiometric quantity of the acyl halide or the acid anhydride may be used although it is generally preferred to use an excess of up to about 20 percent or more based upon the amount of the vinyl substituted methanoindene reaction product present in the reaction mixture to insure desirable product yields. When the reaction is complete the desired product is recovered from the reaction mixture by conventional means such as extraction and distillation.

As an alternative, but less preferred procedure to the above method for preparing the vinyl and acyloxy substituted methanoindenes, a vinyl and hydroxy substituted methanoindene may be first prepared as hereinabove described and then esterified by reacting it with either an acyl halide or acid anhydride of the classes hereinbefore illustrated to obtain the desired corresponding vinyl and acyloxy substituted methanoindenes.

Examples of vinyl and acyloxy substituted methanoindenes prepared according to the above procedure and illustrative of this class of compounds of this invention include 5 - formoxy -5 - vinyl - 2,3,3a,4,5,6,7,7a - octahydro - 4,7 - methanoindene, 5 - acetoxy - 5 - vinyl - 2,3, 3a,4,5,6,7,7a - octahydro - 4,7 - methanoindene, 5 - propionoxy - 5 - vinyl - 2,3,3a,4,5,6,7,7a - octahydro - 4,7-methanoindene, 5 - isobutyroxy - 5 - vinyl - 2,3,3a,4,5,6, 7,7a - octahydro - 4,7 - methanoindene, 5 - hexanoxy- 5 - vinyl - 2,3,3a,4,5,6,7,7a - octahydro - 4,7 - methanoindene, or 5 - (α - methylcrotonoxy) - 5 - vinyl - 2,3,3a,5,6, 7,7a - octahydro - 4,7 - methanoindene, and 3a,4,5,6,7,7a-hexahydro-methanoindene substituted in one of the 5 and 6 positions with vinyl and acyloxy, such as for example, vinyl and formoxy, vinyl and acetoxy, vinyl and propionoxy, vinyl and isobutyroxy, vinyl and hexanoxy or vinyl and α-methylcrotonoxy.

Still another method, although less preferred then the above methods disclosed for preparing the vinyl substituted methanoindenes, is to first prepare the corresponding ethynyl substituted methanoindenes as hereinafter illustrated and then partially hydrogenate the ethnyl group thereof to obtain the corresponding vinyl substituted methanoindenes.

The ethynyl substituted hexahydro or octahydro-4,7- methanoindenes represented by Figures I or II above where Z is ethynyl are prepared specifically by first reacting the corresponding ketone with a metal acetylide. The metal acetylide used for this reaction may comprise an alkali metal acetylide such as lithium, sodium, or potassium acetylide with potassium acetylide being the preferred reactant. The alkali metal acetylide may be prepared according to well known procedures and an acceptable practice for the preparation of the ethynyl compounds of this invention is to prepare the metal acetylide in situ just prior to the reaction thereof with the desired mehanoindenyl ketone. This may be effected for example by reacting the desired metal, preferably in the form of a hydroxide or amide such as potassium hydroxide or potassium amide, with acetylene gas in the presence of a solvent such as liquid ammonia, dimethylformamide, butyl cellusolve, butyl carbitol, ether or toluene or any mixtures thereof at a temperature of about 0° to —50° C. After the metal acetylide is prepared, the desired methanoindenyl ketone is slowly added to the acetylide contained in one of the aforementioned solvents over a period of about one half to five hours with the temperature of the exothermic reaction being maintained at below about 5° C. Temperatures above 5° C. should be avoided because at higher temperatures formation of undesirable glycolic side products occurs. To insure complete reaction of the metal acetylide and the methanoindenyl ketone, which react on an equimolar basis, it is preferred to use an excess of the acetylide of up to about 150 percent or more and to also have excess acetylene present during the reaction. The reaction proceeds rapidly and is generally complete shortly after all of the ketone has been added. However, to insure completion the reaction mixture may be stirred for a short time after the addition of the ketone. The resulting ethynyl substituted reaction product may then be further reacted in several alternate ways to obtain the different ethynyl substituted methanoindenes of this invention.

When it is desired to obtain ethynyl substituted methanoindenes which are also substituted with hydroxy, that is wherein Figures I or II above the X of the X—O radical is hydrogen and the Z radical is ethynyl, the ethynyl substituted reaction product prepared according to the above procedure is reacted with water. This may be accomplished by adding the reaction product to water at a low temperature, preferably below about 5° C. The mixture is then stirred briefly and the desired product is thereafter recovered by conventional methods such as extraction followed by crystallization or distillation. The ethynyl and hydroxy substituted methanoindenes prepared in this fashion are 5-hydroxy-5-ethynyl-2,3,3a,4,5, 6,7,7a - octahydro - 4,7 - methanoindene and 3a,4,5,6,7,7a-hexahydro-4,7-methanoindene substituted in one of the 5 and 6 positions with ethynyl and hydroxy.

When it is desired to obtain ethynyl substituted methanoindenes which are also substituted with an acyloxy substituent, that is where in Figures I or II above the X of the X—O radical is an acyl group and the Z radical is ethynyl, the ethynyl substituted reaction product prepared according to the above procedure is reacted either with an acyl halide or acid anhydride according to the same procedure and with the same reactants and conditions as illustrated for the preparation of the vinyl and acyloxy substituted methanoindenes. As an alternative to this procedure, however, and as the preferred method for preparing the ethynyl and acyloxy substituted methanoindenes of this invention, the desired corresponding ethynyl and hydroxy substituted methanoindenes are first prepared according to the procedure hereinabove described and then are esterified either with an acyl halide or acid anhydride of the classes hereinbefore enumerated to obtain the desired acyloxy and ethynyl substituted methanoindenes.

The esterification of the ethynyl and hydroxy substituted methanoindenes may be effected by reacting the desired hydroxy and ethynyl substituted methanoindene with the desired acyl halide or acid anhydride at a temperature of from about 50° to 130° C. for from 5 to 30 hours in the presence of a suitable inert solvent such as alkanes or aromatics. When reacting with an acid anhydride it is desirable to use a suitable catalyst such as pyridine, phosphoric acid or an alkali metal salt of the corresponding acid, for example sodium acetate with acetic anhydride, to facilitate the reaction. When the reaction is complete the desired product may be recovered in conventional manner such as by extraction and distillation. Examples of the ethynyl and acyloxy substituted methanoindenes prepared according to either of the above methods and illustrative of this class of compounds of this invention include 5-formoxy-5-ethynyl-2,3,3a,4,5,6,7,7a - octahydro - 4,7 - methanoindene, 5-acetoxy - 5 - ethynyl - 2,3,3a,4,5,6,7,7a - octahydro - 4,7-methanoindene, 5 - propionoxy - 5 - ethynyl - 2,3,3a,4,5, 6,7,7a - octahydro - 4,7 - methanoindene, 5 - isobutyroxy - 5 - ethynyl - 2,3,3a,4,5,6,7,7a - octahydro - 4,7-methanoindene, 5 - hexanoxy - 5 - ethynyl - 2,3,3a,4,5,6, 7,7a - octahydro - 4,7 - methanoindene or 5 - (alpha-methylcrotonoxy) - 5 - ethynyl - 2,3,3a,4,5,6,7,7a - octahydro - 4,7 - methanoindene and 3a,4,5,6,7,7a - hexahydro - 4,7 - methanoindene substituted in one of the 5 and 6 positions with ethynyl and acyloxy, such as for example, ethynyl and formoxy, ethynyl and acetoxy, ethynyl and propionoxy, ethynyl and isobutyroxy, ethynyl and hexanoxy, or alpha-methylcrotonoxy.

As hereinbefore indicated the highly pleasant odoriferous nature of the novel compositions of this invention render them highly valuable as perfume ingredients. The odor and odor characteristics of the different compositions embraced within this invention differ widely, however, and of the different compositions the most remarkable odors both from the standpoint of their pleasing nature and from their odor classification are possessed by the hexahydro- and octahydro-4,7-methanoindenes substituted with vinyl and acetoxy. These compositions possess odors which are utilizable to simulate or to extend the odors of the highly valuable naturally occurring lavandin and lavender oils.

The compositions of this invention may be used in perfumery, either individually or in admixture, as olfactory ingredients of perfumes. As used herein, the term perfume means a mixture of organic compounds, including for example, alcohols, aldehydes, ketones, esters, and frequently also hydrocarbons which are combined in fixed proportions so that the odors of the individual compounds combine to produce a harmonious fragrance. The quantity of the novel compositions of this invention utilized in perfumes may vary within a wide range and depends upon the particular composition used and the particular type of perfume to be prepared or improved. For example, in the preparation of Lavender or Lavendin-type perfumes using the vinyl and acetoxy substituted methanoindenes as olfactory ingredients, the quantity used may range from about 0.1 to 80 percent of the total weight of the perfume with a quantity of about 20 to 50 percent by weight being preferred.

Perfumes containing the compositions of this invention as olfactory ingredients may be used per se or incorporated into items such as cosmetic creams, soaps, synthetic detergents, talcum powders or other toilet goods such as shampoos to produce products having desirable commercial fragrance properties.

The following examples are given to illustrate the compositions of matter of this invention, the preparational processes therefor and perfumes containing the compositions as olfactory ingredients. These examples are not, however, intended to limit the generally broad scope of the present invention in strict accordance therewith.

Example I

The methanoindenyl ketones used to prepare the compositions of this invention were prepared as follows:

(A) 3a,4,5,6,7,7a - hexahydro-4,7-methanoindene substituted in one of the 5 and 6 positions with an oxo substitutent.

To a stirred reaction flask were added about 946 grams (7.17 mols) of 3a,4,7,7a-tetrahydro-4,7-methanoindene and 2800 grams of aqueous sulfuric acid (25% by weight $H_2SO_4$). The mixture was then heated to reflux (about 105° C.) for about 5.5 hours. The mixture was then cooled to about 25° C. and the product extracted with about 700 cubic centimeters of toluene. The toluene extract was washed to a neutral pH with an aqueous sodium chloride solution and then distilled to recover about 906 grams of the desired 3a,4,5,6,7,7a-hexahydro-4,7-methanoindene substituted in one of the 5 and 6 positions with hydroxy boiling at about 117° C. at 9 mm. Hg and having a refractive index of $1.5262_D{}^{20}$.

To a stirred reaction flask were charged 76 grams (0.74 mol) of concentrated sulfuric acid, about 425 milliliters of water and about 0.3 mol of sodium dichromate (117 grams of a 70 weight percent aqueous sodium dichromate solution). With the temperature maintained at about 40° to 50° C., about 68 grams (0.453 mol) of 3a,4,5,6,7,7a-hexahydro-4,7-methanoindene substituted in one of the 5 and 6 positions with hydroxy boiling about 78° C. at 0.5 mm. Hg to 84° C. at 0.8 mm. Hg and having a refractive index of 1.5262 to $1.5268_D{}^{20}$ were slowly added to the flask over a period of about 20 minutes. After the addition, the mixture was stirred for about one hour with the temperature varying from about 30° to 55° C. The product was extracted from the final mixture with about 200 milliliters hexane. The hexane extract was washed to neutral with aqueous sodium chloride solution, dried over calcium chloride and distilled to recover the desired ketone product boiling at about 71° C. at 1.0 mm. Hg and having a refractive index of $1.5174_D{}^{20}$.

(B) 5-oxo-2,3,3a,4,5,6,7,7a-octahydro - 4,7 - methanoindene.—5-hydroxy - 2,3,3a,4,5,6,7,7a-octahydro - 4,7-methanoindene was prepared from the corresponding hydroxy substituted hexahydromethanoindene prepared in Part A above by charging about 369 grams of the hydroxy substituted hexahydromethanoindene to an autoclave and hydrogenating in the presence of about 40 grams of a reduced nickel catalyst at about 120° C. and 200 to 500 pounds per square inch hydrogen pressure. About 25 minutes was required for complete hydrogenation. The catalyst was removed by filtration and the hydrogenation product distilled to give about 353 grams of the desired product boiling about 100° C. to 2.0 mm. Hg and having a refractive index of $1.5136_D{}^{20}$.

The reaction was effected according to the procedure of Part A above using about 343 grams (2.26 mols) of 5-hydroxy-2,3,3a,4,5,6,7,7a-octahydro - 4,7 - methanoindene boiling about 95° C. to 100° C. at from 1.5 to 2.0 mm. Hg and having a refractive index of 1.5134 to $1.5138_D{}^{20}$, about 1.52 mols of sodium dichromate (580 grams of a 70 weight percent aqueous sodium dichromate solution), about 2150 grams of water and about 272 grams of concentrated sulfuric acid to give about 272 grams of the desired ketone boiling at 70° C. at 1.0 mm. Hg, and having a refractive index of $1.5025_D{}^{20}$.

Example II 3a,4,5,6,7,7a-hexahydro-4,7-methanoindene substituted in one of the 5 and 6 positions with hydroxy and vinyl was prepared according to the process of this invention by the following procedure:

To a stirred reaction flask containing about 48.6 grams (2.0 mols) of magnesium metal turnings and about 400 milliliters of tetrahydrofuran, vinyl chloride was charged by bubbling the gas into the mixture at about 40° to 60° C. to form vinyl magnesium chloride. The vinyl chloride was charged for a period sufficient to insure complete reaction of the magnesium as indicated by the total visual disappearance of the magnesium turnings, which in this preparation was a period of about 24 hours. The flask was then cooled to and maintained at about 25° L. About 281 grams (1.9 mols) of a hexahydromethanoindenyl ketone comprising 3a,4,5,6,7,7a - hexahydro - 4,7-methanoindene having an oxo substituent in one of the 5 and 6 positions dissolved in about 300 milliliters of tetrahydrofuran were then slowly added to the flask over a period of about 30 minutes. After completion of the addition the resulting reaction mixture was stirred for about 10 minutes. At this point the expensive tetrahydrofuran solvent was removed from the mixture by distillation and thereafter replaced with about 600 milliliters of a less expensive anhydrous toluene solvent.

Then about 600 milliliters of a saturated aqueous ammonium chloride solution were added at a temperature of about 25° C. and the resulting aqueous phase was separated from the organic phase. The aqueous phase was extracted with toluene, and the extract added to the organic phase. The combined organic mixture was first washed with about 200 milliliters of a 10% aqueous hydrochloric acid solution followed with a 5% sodium bicarbonate solution and then with salt water until the organic mixture was neutral to litmus. The organic mixture was then distilled to recover about 307 grams of a product boiling at about 90° C. at 0.7 mm. Hg and solidifying at room temperature. Upon recrystallizing from methylethyl ketone, a product fraction was obtained melting at 40° to 41° C.

Example III

5 - hydroxy - 5 - vinyl - 2,3,3a,4,5,6,7,7a - octahydro-4,7-methanoindene was prepared according to the process of this invention by the following procedure:

To a stirred reaction flask containing about 18.2 grams (0.75 mol) of magnesium metal turnings and about 150 milliliters of tetrahydrofuran, vinyl chloride was charged by bubbling the gas into the mixture at about 40° to 60° C. to form vinyl magnesium chloride. The vinyl chloride was charged for a period sufficient to insure complete reaction of the magnesium as indicated by the total visual disappearance of the magnesium turnings, which in this preparation was a period of about 24 hours. The flask was then cooled to and maintained at about 25° C. About 105 grams (0.7 mol) of 5-oxo-2,3,4,5,6,7,7a-octahydro-4,7-methanoindene dissolved in 100 milliliters of tetrahydrofuran were slowly added to the flask over a period of about 20 minutes. After completion of the addition, the resulting reaction mixture was stirred for about 10 minutes. At this point the expensive tetrahydrofuran solvent was removed from the mixture by distillation and thereafter replaced with an equivalent amount of anhydrous toluene.

Then about 600 milliliters of a saturated aqueous ammonium chloride solution were added at a temperature of about 25° C. and the resulting aqueous phase was separated from the organic phase. The aqueous phase was extracted with toluene, and the extract added to the organic phase. The combined organic mixture was washed with about 200 milliliters of a 10% aqueous hydrochloric acid solution followed with a 5% sodium bicarbonate solution and then with salt water until the organic mixture was neutral to litmus. The organic mixture was then distilled to recover about 94 grams of a product boiling at about 90° C. at 0.7 mm. Hg and solidifying at room temperature. Upon recrystalling from acetone, a product fraction was obtained melting at 43.4° to 44.8° C.

Example IV 3a,4,5,6,7,7a-hexahydro-4,7-methanoindene substituted in one of the 5 and 6 positions with acetoxy and vinyl was prepared according to the process of this invention by the following procedure:

To a stirred reaction flask containing about 62 grams (2.6 mols) of magnesium metal turnings and about 900 milliliters of tetrahydrofuran, vinyl chloride was charged by bubbling the gas into the mixture at about 40° to 60° C. to form vinyl magnesium chloride. The vinyl chloride was charged for a period sufficient to insure complete reaction of the magnesium as indicated by the total visual disappearance of the magnesium turnings, which in this preparation was a period of about 24 hours. The flask was then cooled to and maintained at about 25° C. About 340 grams (2.3 mols) of a hexahydromethanoindenyl ketone comprising 3a,4,5,6,7,7a-hexahydro-4,7-methanoindene having the oxo substituent in one of the 5 and 6 positions dissolved in 275 milliliters of tetrahydrofuran were then slowly added to the flask over a period of about 20 minutes. After completion of the addition the resulting reaction mixture was stirred for about 10 minutes. At this point the expensive tetrahydrofuran solvent was removed from the mixture by distillation and thereafter replaced by an equivalent amount of a less expensive anhydrous toluene solvent.

Then about 288 grams (2.82 mols) of acetic anhydride were slowly added to the flask containing the vinyl substituted reaction product over a period of about 25 minutes with the temperature being maintained at about 40° to 50° C. The mixture was then allowed to stand for a few hours. Water was then added to the mixture and the resulting aqueous layer was separated from the organic layer and extracted with toluene. The toluene extract was then combined with the organic layer and the combined organic mixture washed first with an aqueous sodium bicarbonate solution and then with aqueous sodium chloride solution until the mixture was neutral. The organic mixture was then distilled to recover about 423 grams of a product boiling about 102° C. at 2 mm. Hg and having a refractive index of $1.5040_D^{20}$.

Example V 3a,4,5,6,7,7a-hexahydro-4,7-methanoindene substituted in one of the 5 and 6 positions with acetoxy and vinyl was prepared according to the process of this invention by the following procedure:

About 36 grams (0.21 mol) of 3a,4,5,6,7,7a-hexahydro-4,7-methanoindene substituted in one of the 5 and 6 positions with hydroxy and vinyl boiling about 88° to 95° C. at 0.8 mm. Hg and prepared according to the procedure of Example II were esterified with about 24.2 grams of acetic anhydride in the presence of about 2.42 grams of sodium acetate and an organic solvent at reflux temperatures for about 21 hours. About 36 grams of a liquid product boiling about 99° C. at 1 mm. Hg and having a refractive index of $1.5060_D^{20}$ were recovered.

Example VI 3a,4,5,6,7,7a-hexahydro-4,7-methanoindene substituted in one of the 5 and 6 positions with propionoxy and vinyl is prepared according to the process of this invention by the following procedure:

About 364 grams (2.8 mols) of propionic anhydride in toluene are slowly added over a period of about 25 minutes to a flask containing a vinyl substituted reaction product prepared according to the procedure of Example IV with the temperature being maintained at about 40° to 50° C. The mixture is then stirred for about 8 hours. Water is then added to the mixture and the resulting aqueous layer is separated from the organic layer and extracted with toluene. The toluene is then combined with the organic layer and the combined organic mixture washed with sodium bicarbonate solution and then to neutral with salt water. The organic mixture is then distilled to recover the desired product.

Example VII

5 - acetoxy - 5 - vinyl - 2,3,3a,4,5,6,7,7a - octahydro-4,7-methanoindene was prepared according to the process of this invention by the following procedure:

To a stirred reaction flask containing about 80 grams (3.3 mols) of magnesium metal turnings and about 1000 milliliters of tetrahydrofuran, vinyl chloride was charged by bubbling the gas into the mixture at about 40° to 60° C. to form vinyl magnesium chloride. The vinyl chloride was charged for a period sufficient to insure complete reaction of the magnesium as indicated by the total visual disappearance of the magnesium turnings which in this preparation was a period of about 24 hours. The flask was then cooled to and maintained at about 40° C. About 420 grams (2.8 mols) of an octahydromethanoindenyl ketone comprising 5-oxo-2,3,3a,4,5,6,7,7a-octahydro-4,7-methanoindene dissolved in 400 milliliters of tetrahydrofuran were slowly added to the flask over a period of about 20 minutes. After completion of the addition, the resulting reaction mixture was stirred for about 10 minutes. At this point the expensive tetrahydrofuran solvent was removed from the mixture by distillation and thereafter replaced by an equivalent amount of a less expensive anhydrous toluene solvent.

Then about 400 grams (3.92 mols) of acetic anhydride in about 275 grams of toluene were slowly added to the flask containing the vinyl substituted reaction product over a period of about 60 minutes with the temperature being maintained at about 30° to 40° C. The mixture was then stirred for about 16 hours. About 1500 milliliters of water were then added and the resulting aqueous layer was separated from the organic layer and extracted with toluene. The toluene extract was then combined with the organic layer and the combined organic mixture washed first with an aqueous sodium bicarbonate solution and then to neutral with aqueous sodium chloride solution. The organic mixture was then distilled to recover about 423 grams of a product boiling about 113° C. at 5 mm. Hg and having a refractive index of $1.4964_D^{20}$.

Example VIII

5 - acetoxy - 5-vinyl - 2,3,3a,4,5,6,7,7a - octahydro-4,7-methanoindene was prepared according to the process of this invention by the following procedure:

About 36.5 grams (0.21 mol) of 5-hydroxy-5-vinyl-2,3,3a,4,5,6,7,7a-octahydro - 4,7 - methanoindene boiling about 71° C. at 0.15 mm. Hg to 80° C. at 0.1 mm. Hg and prepared according to the procedure of Example III were esterified with about 24.2 grams of acetic anhydride in the presence of about 2.42 grams of sodium acetate and an organic solvent at reflux temperature for about 16 hours. About 37 grams of a liquid product boiling about 95° C. at 0.8 mm. Hg and having a refractive index of $1.5008_D^{20}$ were recovered.

Example IX 5-propionoxy - 5 - vinyl - 2,3,3a,4,5,6,7,7a - octahydro-4,7-methanoindene is prepared according to the process of this invention by the following procedure:

About 507 grams (3.9 mols) of propionic anhydride in about one liter of toluene are slowly added over a period of about 30 minutes to a flask containing a vinyl substituted reaction product prepared according to the procedure of Example VII with the temperature being maintained at about 30° to 40° C. The mixture is then stirred for about 8 hours. Water is then added and the resulting aqueous layer is separated from the organic layer and extracted with toluene. The toluene extract is then combined with the organic layer and the combined organic mixture washed first with aqueous sodium bicarbonate solution and then with aqueous sodium chloride solution until neutral. The organic mixture is then distilled to recover the desired product.

Example X 3a,4,5,6,7,7a-hexahydro-4,7-methanoindene substituted in one of the 5 and 6 positions with ethynyl and hydroxy was prepared according to the process of this invention by the following procedure:

To a reaction flask were added about 200 grams (3.32 mols) of potassium hydroxide (about 93 weight percent KOH), about 600 milliliters of toluene and 60 milliliters of n-butyl alcohol. The mixture was then heated to reflux and stirred vigorously for about 15 minutes and thereafter cooled to about −10° C. Then about 58 milliliters of dimethyl formamide were added and acetylene was then continuously charged to the flask and bubbled through the mixture. With the temperature maintained at about −10° C., about 197 grams (1.33 mols) of a hexahydromethanoindenyl ketone comprising 3a,4,5,6,7,7a-hexahydro-4,7-methanoindene having the oxo substituent in one of the 5 and 6 positions were added over a period of about 60 minutes. The contents of the flask were then removed and charged rapidly with stirring to another flask containing about 1000 grams of an ice-water mixture. The resulting aqueous layer was separated from the organic layer and extracted with toluene. The toluene extract was then combined with the organic layer and the combined mixture washed first with a 5% aqueous sodium bicarbonate solution and then to neutral with aqueous sodium chloride solution. The organic mixture was then reduced in volume by distillation to about 500 milliliters and thereafter cooled to about −10° C. The solids which formed were filtered from the liquid to recover about 138 grams of a solid product melting at 95° to 96.8° C. The remaining liquid was distilled to recover a liquid product boiling at 90° C. at less than 1 mm. Hg and having a refractive index of 1.5266 to $1.5298_D^{20}$.

Example XI 5-hydroxy - 5 - ethynyl - 2,3,3a,4,5,6,7,7a - octahydro-4,7-methanoindene was prepared according to the process of this invention by the following procedure:

To a reaction flask were added about 200 grams of potassium hydroxide (about 93 weight percent KOH), 600 milliliters of toluene and 44 milliliters of n-butyl alcohol. The flask was then heated to reflux and stirred vigorously for about 15 minutes and thereafter cooled to about −10° C. About 60 milliliters of dimethylformamide were added and acetylene was then continuously charged to the flask and bubbled through the mixture. With the temperature maintained at about −10° C., about 126 grams (0.84 mol) of 5-oxo-2,3,3a,4,5,6,7,7a-octahydro-4,7-methanoindene were added over a period of about 60 minutes. The contents of the flask were removed and then charged rapidly with stirring to another flask containing about 1000 grams of an ice-water mixture. The resulting aqueous layer was separated from the organic layer and extracted with toluene. The toluene extract was then combined with the organic layer and first washed with a 5% aqueous sodium bicarbonate solution and then to neutral with an aqueous sodium chloride solution. The organic mixture was then distilled to recover about 117 grams of a product boiling about 129° C. at 12 mm. Hg. The product solidified upon cooling to about 5° C. and then was recrystallized from toluene to yield about 103 grams of a crystalline product melting at 109° to 111° C.

Example XII 3a,4,5,6,7,7a-hexahydro-4,7-methanoindene substituted in one of the 5 and 6 positions with acetoxy and ethynyl was prepared according to the process of this invention by the following procedure:

About 26 grams (0.15 mol) of a crystallized 3a,4,5,6,7,7a-hexahydro-4,7-methanoindene substituted in one of the 5 and 6 positions with hydroxy and ethynyl prepared according to the procedure of Example X and melting about 99.2° to 102° C. were esterified with about 17 grams (6.168 mol) of acetic anhydride in the presence of 1.7 grams of sodium acetate and an organic solvent at a temperature of from about 100° C. to 130° C. for about 20 hours. About 27.5 grams of a liquid product boiling about 98° C. at 0.9 mm. Hg and having a refractive index of $1.5095_D^{20}$ were recovered.

Example XIII 3a,4,5,6,7,7a-hexahydro-4,7-methanoindene substituted in one of the 5 and 6 positions with propionoxy and ethynyl is prepared according to the process of this invention by the following procedure:

3a,4,5,6,7,7a-hexahydro-4,7-methanoindene substituted in one of the 5 and 6 positions with hydroxy and ethynyl prepared according to the procedure of Example X is esterified with propionic anhydride in the presence of an organic solvent and sodium propionate at a temperature of from about 100° to 130° C. for about 24 hours to produce the desired product.

Example XIV 5-acetoxy-5-ethynyl - 2,3,3a,4,5,6,7,7a - octahydro-4,7-methanoindene was prepared according to the process of this invention by the following procedure:

About 220 grams (1.23 mols) of a distilled, uncrystallized 5 - hydroxy - 5 - ethynyl-2,3,3a,4,5,6,7,7a-octahydro-4,7-methanoindene boiling about 140° C. at 20 mm. Hg and prepared according to the procedure of Example XI were esterified with about 142 grams of acetic anhydride in the presence of an organic solvent and a catalyst comprising 14.2 grams of sodium acetate at a temperature of from about 100° to 130° C. for about 8 hours. The resulting mixture was treated by extraction and distillation to recover about 214 grams of a liquid product boiling about 110° C. at 10 mm. Hg and having a refractive index of $1.5004_D^{20}$.

Example XV 5-propionoxy - 5 - ethynyl-2,3,3a,4,5,6,7,7a-octahydro-4,7-methanoindene is prepared according to the process of this invention by the following procedure:

5-hydroxy-5-ethynyl - 2,3,3a,4,5,6,7,7a - octahydro-4,7-methanoindene prepared according to the procedure of Example XI is esterified with propionic anhydride in the presence of an organic solvent and sodium propionate at a temperature of from about 100° to 130° C. for about 24 hours to produce the desired product.

Example XVI

5 - vinyl - 5 - acetoxy - 2,3,3a,4,5,6,7,7a-octahydro-4,7-methanoindene was prepared according to the process of this invention by the following procedure:

To a Parr hydrogenation bottle were charged about 20 grams (0.0916 mol) of 5-ethynyl-5-acetoxy-2,3,3a,4,5,6,7,7a-octahydro-4,7-methanoindene prepared according to the procedure of Example XIV, about 33 milliliters of hexane and about 0.04 gram of a catalytic composite comprising palladium on a barium carbonate carrier and containing 5 weight percent palladium. The mixture was agitated under an initial hydrogen pressure of about 40 pounds per square inch and at a temperature of about 20° C. until the amount of hydrogen (about 0.0916 mol) necessary to reduce the ethynyl group to vinyl had been absorbed. After removing the catalyst from the hydrogenation mixture by filtration, the mixture was distilled to recover the desired product.

Example XVII

A perfume having a Lavender character was made using as an olfactory ingredient 5-vinyl-5-acetoxy-2,3,3a,4,5,6,7,7a-octahydro-4,7-methanoindene prepared according to the procedure of Example VII. The perfume contained the following ingredients in the indicated weight percent:

| | |
|---|---|
| Vinyl - acetoxy - octahydromethanoindene of the above description | 31 |
| Linalool | 30 |
| Linalyl acetate | 10 |
| Alpha-terpeniol | 5 |
| Terpenyl acetate | 10 |
| Isoborneol | 5 |
| Ethyl amyl ketone | 1 |
| Allyl phenyl propionate | 2 |
| Geraniol | 2 |
| Isobornyl propionate | 2 |
| Coumarin | 0.5 |
| Alpha-pinene | 1 |
| Amyl formate | 0.5 |
| | 100.0 |

Example XVIII

A perfume having a Lavender character was made using as an olfactory ingredient 5-vinyl-5-acetoxy-2,3,3a,4,5,6,7,7a-octahydro-4,7-methanoindene prepared according to the procedure of Example VII. The perfume contained the following ingredients in the indicated weight percent:

| | |
|---|---|
| Vinyl - acetoxy - octahydromethanoindene of the above description | 25 |
| Linalool | 38 |
| Linalyl acetate | 10 |
| Alpha-terpeniol | 5 |
| Terpinyl acetate | 10 |
| Isoborneol | 2 |
| Ethyl amyl ketone | 2 |
| Allyl phenyl propionate | 2 |
| Geraniol | 2 |
| Isobornyl propionate | 2 |
| Coumarin | 0.5 |
| Alpha-pinene | 1 |
| Amyl formate | 0.5 |
| | 100.0 |

Example XIX

A perfume having a Lavender character was made using as an olfactory ingredient 5-vinyl-5-acetoxy-2,3,3a,4,5,6,7,7a-octahydro-4,7-methanoindene prepared according to the procedure of Example VII. The perfume contained the following ingredients in the indicated weight percent:

| | |
|---|---|
| Vinyl - acetoxy - octahydromethanoindene of the above description | 35.0 |
| Camphene | 3.0 |
| Alpha-pinene | 1.0 |
| Linalool oxide | 0.5 |
| Ethyl amyl ketone | 1.0 |
| Alcohol C-6 | 0.5 |
| Methylheptenone | 0.5 |
| 2-hexenal | 0.5 |
| Iso-borneol | 2.0 |
| Alpha-terpeniol | 3.0 |
| Nerol | 3.0 |
| Linalool | 41.0 |
| Eucalyptol | 0.5 |
| Isobornyl acetate | 2.0 |
| 6,8-diisopropyl dihydrocoumarin | 0.5 |
| Coumarin | 0.5 |
| Terpinyl isobutyrate | 1.0 |
| Dimethyl acrylic acid | 0.5 |
| Ocimene | 3.0 |
| Oil lemon | 0.5 |
| Oil clove | 0.5 |
| | 100.0 |

Example XX

A perfume having a Lavandin oil character was made using a 3a,4,5,6,7,7a-hexhaydro-4,7-methanoindene substituted in one of the 5 and 6 positions with acetoxy and vinyl prepared according to the procedure of Example IV. The perfume contained the following ingredients in the indicated weight percent:

| | |
|---|---|
| Vinyl-acetoxy-hexahydromethanoindene of the above description | 30.0 |
| Camphene 97% | 3.0 |
| Gum camphor | 0.5 |
| Alpha-pinene | 1.0 |
| Linalool oxide | 0.5 |
| Ethyl amyl ketone | 1.0 |
| Alcohol C-6 | 0.5 |
| Methylheptenone | 0.5 |
| 2-hexenal | 0.5 |
| Iso-borneol | 2.0 |
| Alpha-terpeniol | 3.0 |
| Nerol | 3.0 |
| Linalool | 43.0 |
| Eucalyptol | 3.0 |
| Isobornyl acetate | 2.0 |
| 6,8-diisopropyl dihydrocoumarin | 0.5 |
| Coumarin | 0.5 |
| Terpinyl isobutyrate | 1.0 |
| Dimethyl acrylic acid | 0.5 |
| Ocimene | 3.0 |
| Oil lemon | 0.5 |
| Oil clove | 0.5 |
| | 100.0 |

I claim as my invention:

1. A compound selected from the group consisting of 3a,4,5,6,7,7a-hexahydro-4,7-methanoindene and 2,3,3a,4,5,6,7,7a-octahydro-4,7-methanoindene which is substituted in one of the 5 and 6 positions both with a radical of the formula:

$$X—O—$$

and with a radical of the formula:

$$Z—$$

wherein X is a member selected from the group consisting of hydrogen and an acyl group containing from 1 to 7 carbon atoms, said acyl group being derived from a lower alkanoic acid, alpha-methyl crotonic acid or beta-methyl crotonic acid, O is oxygen and Z is a member selected from the group consisting of vinyl and ethynyl.

2. 3a,4,5,6,7,7a - hexahydro-4,7-methanoindene substituted in one of the 5 or 6 positions with acetoxy and vinyl.

3. 5-acetoxy-5-vinyl - 2,3,3a,4,5,6,7,7a - octahydro-4,7-methanoindene.

4. 3a,4,5,6,7,7a - hexahydro-4,7-methanoindene substituted in one of the 5 and 6 positions with acetoxy and ethynyl.

5. 5-acetoxy-5-ethynyl - 2,3,3a,4,5,6,7,7a - octahydro-4,7-methanoindene.

6. 3a,4,5,6,7,7a - hexahydro-4,7-methanoindene substituted in one of the 5 and 6 positions with propionoxy and vinyl.

7. 5-propionoxy-5-vinyl - 2,3,3a,4,5,6,7,7a - octahydro-4,7-methanoindene.

References Cited

UNITED STATES PATENTS

| | | | |
|---|---|---|---|
| 2,334,291 | 11/1945 | Ruzicka et al. | 260—488 |
| 3,110,747 | 11/1963 | Mullineaux | 260—618 |
| 3,271,259 | 9/1966 | Saunders | 260—488 X |

(Other references on following page)

OTHER REFERENCES

Tedeschi et al., J. Org. Chem. 27: 4323–26 (1962).
Bal'yan, C.A. 49: 6174 (1955).
Migrdichian, Org. Synthesis, vol. 1, pp. 554–555 (1957).
Wagner-Zook, Synthetic Org. Chem., 1953, pp. 162–163.
Nikitin et al., CA, 55: 22162–163 (1961).
Zalkind et al., CA, 34: 387 (1940).

LORRAINE A. WEINBERGER, *Primary Examiner.*

V. GARNER, *Assistant Examiner.*